United States Patent [19]

Okawa

[11] 4,098,236
[45] Jul. 4, 1978

[54] DEVICE FOR SUPPLYING FUEL TO AN INTERNAL COMBUSTION ENGINE

[75] Inventor: Susumu Okawa, Aichi, Japan

[73] Assignee: Toyota Jidosha Kogyo Kabushiki Kaisha, Toyota, Japan

[21] Appl. No.: 765,067

[22] Filed: Feb. 2, 1977

[30] Foreign Application Priority Data

Oct. 29, 1976 [JP] Japan .................. 51-129334

[51] Int. Cl.² .............................................. F01P 3/12
[52] U.S. Cl. .................... 123/41.02; 165/105;
   123/41.31; 123/136; 261/36 A; 261/72 R; 261/130
[58] Field of Search ............. 123/41.31, 136, 41.02; 261/36 A, 130, 72 R; 165/105

[56] References Cited

U.S. PATENT DOCUMENTS

| | | | |
|---|---|---|---|
| 3,196,926 | 7/1965 | Gartland | 123/41.31 X |
| 3,477,238 | 11/1969 | Race | 123/136 X |
| 3,628,516 | 12/1971 | Perrin et al. | 261/36 A X |
| 3,884,293 | 5/1975 | Pessolano et al. | 165/51 |
| 4,036,188 | 7/1977 | Sami et al. | 123/41.31 |

Primary Examiner—Albert W. Davis, Jr.
Attorney, Agent, or Firm—Stevens, Davis, Miller & Mosher

[57] ABSTRACT

Disclosed is a device for supplying fuel from the fuel tank to the carburetor in an internal combustion engine, which device includes a fuel pump adapted for forcibly supplying the necessary amount of fuel into the carburetor and for recirculating an extra amount of fuel to the fuel tank. A heat pipe is, on one end thereof, arranged to touch the fuel in the carburetor and, on the other end thereof, to touch the recirculated fuel. The heat pipe operates to remove the heat of the hot fuel in the carburetor and to transfer the heat to the recirculated cool fuel. Thus the evaporation of the fuel in the carburetor can be effectively prevented.

2 Claims, 4 Drawing Figures

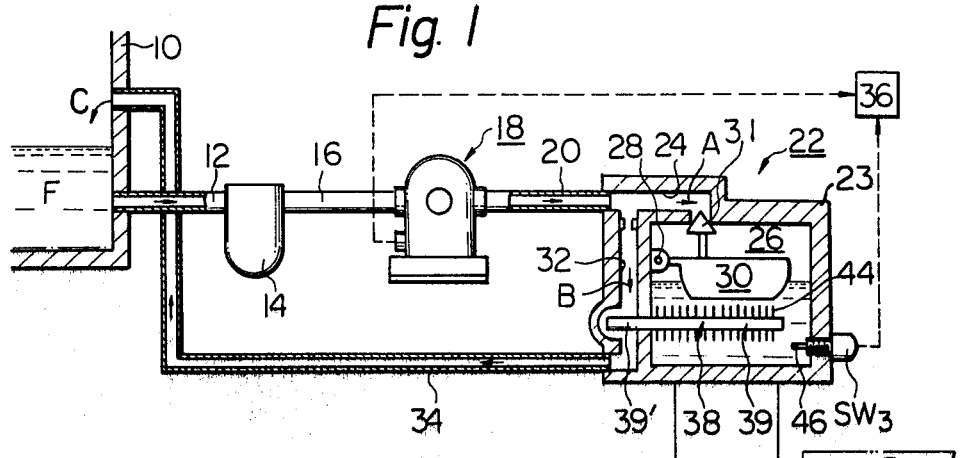
Fig. 1
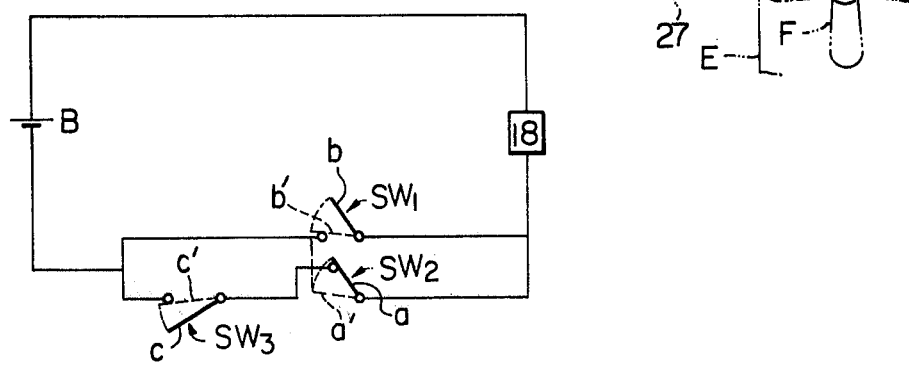
Fig. 2
Fig. 4
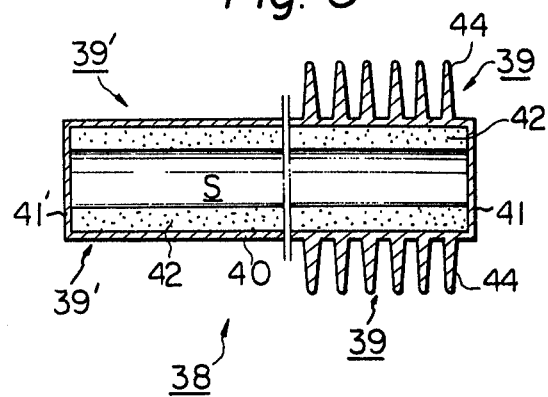
Fig. 3

DEVICE FOR SUPPLYING FUEL TO AN INTERNAL COMBUSTION ENGINE

FIELD OF THE INVENTION

The present invention relates to a device for supplying fuel to an internal combustion engine, which is capable of preventing an increase in the temperature of fuel in the carburetor located near the engine body of high temperature.

BACKGROUND OF THE INVENTION

In an internal combustion engine of carburetor type, the temperature of the fuel in the float chamber of the carburetor located near the engine body is apt to be increased just after the engine is stopped or when the engine is operating in the idle condition. This is because, since the cooling fan is not operated or is insufficiently operated when the engine is operating under such conditions, the carburetor located near the engine body is subjected to the high temperature of the engine body. Due to the increase of the temperature of the fuel just after the engine is stopped, the fuel is evaporated, and is lost to the atmosphere, causing a bad fuel consumption efficiency as well as public pollution which is now legally restricted. Further, if the fuel is evaporated during the engine idle condition, it is impossible to obtain a predetermined air-fuel ratio, and this causes rough idle operation of the engine.

For preventing the increase of the temperature of the fuel in the carburetor due to the high temperature of the engine body, a device has already been proposed that has a supplementary cooling fan facing the carburetor. The supplementary fan is operated when the air temperature in the engine room is increased to a predetermined temperature in order to cool the carburetor body whereby an increase of the temperature of the carburetor can be prevented. However, this type of device suffers from such drawbacks that a special design is necessary for the vehicle body, because of the limited space of the engine room, and that the supplementary fan requires a relatively large power consumption, as high as 45–80W, so that it is necessary to increase the capacity of the battery of the engine.

SUMMARY OF THE INVENTION

An object of the present invention is to provide a device for preventing the evaporation of fuel, in which the drawbacks in the known art can be effectively eliminated.

Another object of the present invention is to provide a device for supplying fuel to an internal combustion engine, which can effectively prevent the evaporation of the fuel in spite of its simple construction and low cost.

According to the present invention a device for supplying fuel to an internal combustion engine of carburetor type is provided, said device comprising: a fuel tank; first passageway means adapted for connecting said fuel tank with the float chamber of the carburetor; a pump device arranged on said first passageway means for forcibly introducing an amount of fuel into said float chamber; second passageway means connecting the first passageway means downstream of the pump device with said fuel tank for recirculating an extra amount of fuel from the first passageway means to the fuel tank, and; a heat exchanging member, one end of which is located in the float chamber so that it touches the fuel in the float chamber and the other end of which is located in said second passageway means so that it touches the extra amount of fuel recirculated into the fuel tank from said first passageway means. As a result of this arrangement the heat of the hot fuel in the float chamber due to the high temperature of the carburetor is, via said heat exchanging means, transmitted to the cool fuel recirculated in said second passageway means. Therefore, an increase of the temperature of the fuel in the float chamber is prevented.

BRIEF DESCRIPTIONS OF THE DRAWINGS

FIG. 1 is a schematical view of an embodiment of a device according to the present invention;

FIG. 2 illustrates an electrical circuit utilized in the device in FIG. 1;

FIG. 3 is a sectional view of a heat pipe utilized in the device in FIG. 1, and;

FIG. 4 is a graph showing the operation of a thermoswitch in FIG. 1.

DESCRIPTION OF THE PREFERRED EMBODIMENT

In FIG. 1, showing an embodiment of the present invention, the numeral 10 designates a fuel tank of an internal combustion engine which is located at a position remote from an engine body E of the engine. The fuel tank 10 is connected to a strainer 14 via a pipe 12. The strainer 14 is connected to a fuel pump 18 via a pipe 16. The pump 18 is connected to a carburetor 22 of the engine via a pipe 20, which carburetor 22 is located at a position near the engine body E of the engine. In this embodiment, the fuel pump 18 is an electrically operated type which is connected to a battery B of the engine via an ignition switch $SW_1$, as shown in FIG. 2. Therefore, when the ignition switch $SW_1$ is switched to its ON position, as shown by a broken line $b'$, the fuel pump 18 is operated. This causes the fuel in the fuel tank 10 (FIG. 1) to be introduced into the carburetor 22.

The carburetor 22, located near the engine body E, has a housing 23, which forms a float chamber 26 and a fuel supply passageway 24. One end of the passageway 24 communicates with the float chamber 26, whereas the other end of the passageway 24 remote from the float chamber 26 communicates with the pipe 20. Some amount of fuel is stored in the float chamber 26, which is connected to the engine body E via an intake pipe 27. The carburetor 22 further has a float 30 which is pivoted to an inner wall of the chamber 26 by a pin 28, and which floats on the fuel stored in the chamber 26. The float 30 has a needle valve 31 which face the end of the passageway 24 adjacent to the float chamber 26. The needle valve 31 operates to open or close the passageway 24, depending on the position of the float 30, and thus, the level of the fuel in the float chamber 26 is maintained at a predetermined constant level.

A fuel return passageway 32 is formed in the housing 23 of the carburetor 22. One end of the passageway 32 communicates with the fuel supply passageway 24. One end of a fuel return pipe 34 is connected to the other end of the passageway 32. The other end of the pipe 34 is connected to the fuel tank 10.

During the operation of the engine while the ignition switch $SW_1$ is in its ON position, as shown by the broken line $b'$, the fuel pump 18 operates to suck the fuel from the fuel tank 10 via the pipe 12, the strainer 14 and the pipe 16, and to discharge the thus sucked fuel into the passageway 24 of the carburetor 22 via the pipe 20.

The needle valve 31 of the float 30 operates to open or close the passageway 24 to the float chamber 26 so that only a necessary amount of fuel is introduced into the float chamber 26, as shown by an arrow A. As a result, a predetermined constant level of fuel in the float chamber is maintained while the fuel in the float chamber is supplied to the engine intake pipe 27. Therefore, any extra amount of fuel in the fuel supply passageway 24 is directed to the fuel return passageway 32, as shown by an arrow B, and is returned to the fuel tank 10, as shown by an arrow C, via the fuel return pipe 34.

The above-mentioned construction for supplying fuel is substantially the same as the known art. According to the present invention, the hereinafter described construction is further provided in order to prevent the evaporation of the fuel in the float chamber 26 just after the engine is stopped after running or during the engine idle condition after running. In FIG. 1, numeral 38 designates an horizontally elongated heat exchanging member having two ends 39 and 39'. The end 39 is situated in the float chamber 26 so that it touches the fuel in the chamber 26, and the end 39' is situated in the fuel return passageway 32 so that it touches the cool fuel recirculated in the passageway 32, as shown by the arrow B. The end 39 of heat exchanging member 38 removes the heat from the hot fuel in the float chamber 26. The other end 39' of the heat exchanging member 38 operates to transfer the removed heat to the cool fuel recirculated in the passageway 32. As the heat exchanging member 38, a so-called heat pipe, which is itself well known, is used. The heat pipe 38 comprises, as shown in FIG. 3, an elongated tubular body 40. The opposites ends of the body 40 are closed respectively by covers 41 and 41' so that a vacuum space S is formed in the tubular body 40. A wick 42 is formed on the inner cylindrical surface of the tubular body 40 along the longitudinal direction of the body 40. An evaporative fluid, for example water, is contained in the wick 42. During the use of the heat pipe 38, if one end of the heat pipe 38, for example, the end 39, is subjected to a high temperature and the other end 39' is subjected to a low temperature, the water contained in the wick 42 at the position near the end 39 is evaporated, which causes the heat of the end to be removed. Thus, the removed heat is transmitted to the end 39' opposite to the end 39, because the evaporated water is condensed in the wick 42 near the end 39', due to low temperature of the end 39'. Thus, the heat pipe 38 operates to maintain a constant temperature of the ends 39 and 39', in other words, to transmits heat from one end to the other end.

The end 39 of the heat pipe 38 located in the float chamber 26 has a plurality of fins 44 which are formed on the outer cylindrical surface of the heat pipe body 40. The heat of the fuel in the float chamber 26 (FIG. 1) can be effectively removed by the fins 44.

In order to operate the fuel pump 18 just after the stopping of the engine while the temperature of the fuel in the carburetor 22 is extremely increased, a switch $SW_2$ (FIG. 2), adapted for operating the pump 18 after the stopping of the engine, and a thermo-switch $SW_3$, adapted for operating the pump 18 depending on the temperature of the fuel in the carburetor, are arranged between the pump 18 and the battery B in a series relationship. The switch $SW_2$ is cooperated with the ignition switch $SW_1$ in such a manner that the switch $SW_2$ is in its ON position, as shown by a solid line $a$, when the ignition switch $SW_1$ is in its OFF position, as shown by a solid line $b$, and that the switch $SW_2$ is in its OFF position, as shown by a broken line $a'$, when the ignition switch $SW_1$ is in its ON position, as shown by a broken line $b'$. The thermo-switch $SW_3$ has, as shown in FIG. 1, a detecting end 46 arranged in the float chamber 26 so that it touch the fuel in the chamber 26. The switch $SW_3$ is in its ON position, as shown by a broken line $c'$ (FIG. 2) when the temperature of the fuel is higher than a predetermined temperature $T_1$ (FIG. 4), and is switched to its OFF position, as shown by a solid line $c$, when the temperature of the fuel becomes lower than a predetermined temperature $T_2 (T_2 < T_1)$.

The operation of the above described device is as follows.

When the ignition switch $SW_1$ is switched to its OFF position, as shown by the solid line $b$ in FIG. 2, to stop the engine just after high speed running, the carburetor 22 is strongly heated by the high temperature of the engine body E because the cooling fan F is not operated. As a result of this, the temperature of the fuel in the float chamber 26 of the carburetor 22, located near the engine body E of high temperature, exceeds the predetermined temperature $T_1$, so that the thermo-switch $SW_3$ is switched to its ON position, as shown by the broken line $c'$. In the engine stopped condition the switch $SW_2$ cooperating with the ignition switch $SW_1$ is in its ON position, as shown by the solid line $a$ in FIG. 2. Thus, the fuel pump 18 continues to operate even if the ignition switch $SW_1$ is in its OFF position $b$. Therefore, the cool fuel in the fuel tank 10, located remote from the engine body E of high temperature, is sucked into the pump 18 via the pipe 12, the strainer 14 and the pipe 16, and is discharged into the fuel supply passageway 24 via the pipe 20. Since the needle valve 31 is not opened in the engine stopped condition, all of the cool fuel in the passageway 24 is directed to the fuel return passageway 32, as shown by the arrow B, and is recirculated to the fuel tank 10, as shown by the arrow C, via the pipe 34. Since the heat pipe 38 is arranged so that one end 39 touches the hot fuel in the float chamber 26 and the opposite end 39' touch the cool fuel recirculating in the passageway as shown by the arrow B, the heat pipe 38 operates to remove the heat from the hot fuel in the carburetor 22 and to transfer the heat to the cool fuel recirculated in the passageway 32. As a result of this, the increase of the temperature of the fuel in the carburetor 26 is effectively prevented and, therefore, evaporation of the fuel after the stopping of the engine is avoided. After a certain time has elapsed from the operation of the fuel pump 18, the temperature of the fuel in the carburetor is cooled down and the temperature of the fuel in the carburetor is decreased to a value below the predetermined temperature $T_2$ (FIG. 4). Consequently, the thermo-switch $SW_3$ is switched to its OFF position $c$, so that the operation of the fuel pump 18 is stopped.

The above-mentioned temperature increase preventing effect, according to the device of the present invention, is also obtained during the engine is operating in idle condition after high speed running, in which the temperature of the engine body E is apt to be increased because the rotational speed of cooling fan F is relatively low due to the idle operation. Since the amount of the fuel in the fuel supply passageway 24 directed to the float chamber 26, as shown by the arrow A, is small, a large amount of fuel of low temperature is directed to the fuel return passageway 32, as shown by the arrow B. Therefore, heat pipe 38 operates to remove the heat from the fuel of high temperature in the float chamber 26, and to transfer the heat to the fuel of low temperature recirculated in the passageway 32. Thus, the increase of the temperature of the fuel in the carburetor 22 is prevented and the evaporation of the fuel during the engine idle condition is avoided.

According to the present invention, the temperature increase of the fuel in the carburetor is effectively prevented by transferring the heat of the hot fuel in the carburetor 20 to the cool fuel recirculated in the passageway 32. Thus, the supplementary cooling fan of the known art, which is relatively large in dimension, is not necessary, and this allows simplified construction of the engine room. The electrical fuel pump 18 can be operated with a small amount of power, as low as 10W, and therefore, an increase of the capacity of the battery B is not necessary.

As a modification of the above-mentioned embodiment, a time switch can be inserted between the switch $SW_2$ and thermo-switch $SW_3$. This time switch operates to restrict the period of operation of the electrical pump 18, in order to prevent exhaustion of the battery B.

As an another modification, the pipe 20, connecting the fuel pump 18 to the carburetor 22, may be arranged so that it is located before the radiator of the engine, in order to supply forcibly cooled fuel into the carburetor 22.

In the above described embodiment, an engine having an electrical fuel pump is utilized. It an engine having a mechanical fuel pump is utilized, the temperature increase of the fuel in the carburetor can not be prevented just after the engine is stopped after high speed running because the mechanical fuel pump is not operated after the engine has been stopped. However, the temperature increase of the fuel in the carburetor can be effectively prevented during the engine idle condition after high speed running, because the mechanical fuel pump operates to recirculate a sufficient amount of the cool fuel when the engine is operating in the idle condition.

In the above described embodiment, the heat pipe 38 is arranged in the horizontal direction. However, if the heat pipe 38 can be arranged in a vertical direction, in other words, the direction in which gravity acts, the wick 42 is not necessary. This permits reduction of the manufacturing cost of the device.

Many other modifications and changes can be made by those skilled in this art, without departing from the scope and spirit of the invention.

What is claimed is:

1. A device for supplying fuel to an internal combustion engine of carburetor type, said device comprising: a fuel tank; first passageway means adapted for connecting said fuel tank with the float chamber of the carburetor; a pump device arranged on said first passageway means for forcibly introducing an amount of fuel into said float chamber; second passageway means connecting the first passageway means downstream of the pump device with said fuel tank for recirculating an extra amount of fuel from the first passageway means to the fuel tank, and; a heat pipe constituting a heat exchanging member, one end of said pipe being located in a middle portion of the float chamber so that it touches the fuel in the float chamber and the other end thereof being located in said second passageway means so that it touches the extra amount of fuel recirculated into the fuel tank from said first passageway means, whereby the heat of the hot fuel in the float chamber due to the high temperature of the carburetor is, via said heat pipe transmitted to the cool fuel recirculated in said second passageway means under a forced convection principle, thereby preventing an increase of the temperature of the fuel in the float chamber.

2. A device for supplying fuel to an internal combustion engine according to claim 1, further comprising a battery, an ignition switch, said pump device being an electrical one that is operated by said battery of the engine when said ignition switch of the engine is in its ON position to start the engine, a second switch and a third switch arranged in series between said pump and battery, said third switch being a normally open temperature responsive one exposed to the temperature of the fuel in the carburetor float chamber and adapted to move to closed position when a predetermined high fuel temperature is reached and to an open position when a predetermined lower fuel temperature is reached, the first and second switches being so arranged that when the first is in closed circuit position, the second is in open circuit position and vice versa, means interconnecting said switches whereby the pump is operated when the temperature of the fuel in the float chamber is higher than said predetermined temperature, even if the ignition switch is in its OFF position until the temperature of the fuel in the float chamber becomes lower than said predetermined temperature.

* * * * *